United States Patent
Lin et al.

(10) Patent No.: US 9,058,149 B2
(45) Date of Patent: Jun. 16, 2015

(54) DISPLAY APPARATUS COMPRISING MULTIPLE DISPLAY PANELS WITH DIFFERENT RESOLUTIONS

(75) Inventors: Tung-Liang Lin, Hsinchu (TW); Sung-Kon Kim, Hsinchu (TW); Chun-Wei Hsieh, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 163 days.

(21) Appl. No.: 13/220,797

(22) Filed: Aug. 30, 2011

(65) Prior Publication Data

US 2012/0056919 A1  Mar. 8, 2012

(30) Foreign Application Priority Data

Sep. 6, 2010  (TW) .............................. 099130085 A

(51) Int. Cl.
*G06F 3/14* (2006.01)

(52) U.S. Cl.
CPC ............ *G06F 3/1423* (2013.01); *G06F 3/1446* (2013.01); *G09G 2340/0407* (2013.01)

(58) Field of Classification Search
CPC ................. G09G 2340/04; G09G 2340/0407; G09G 5/005; G09G 5/006; G09G 5/18; G09G 5/00; G06F 13/00; G06F 13/18; G06F 3/14; G06F 3/1423; G06F 3/1446; G06F 3/1431; G06F 3/1407; G06F 3/1415
USPC .................. 345/8, 20, 27, 1.1–1.3, 156–214, 345/520–699, 3.1, 3.3, 502; 315/169.2; 348/563; 715/746, 736
See application file for complete search history.

(56) References Cited

U.S. PATENT DOCUMENTS

| | | | | |
|---|---|---|---|---|
| 5,612,715 A * | 3/1997 | Karaki et al. | ................. | 345/698 |
| 6,137,457 A * | 10/2000 | Tokuhashi et al. | ................. | 345/8 |
| 6,593,902 B1 * | 7/2003 | Ogino et al. | .................... | 345/55 |
| 6,894,706 B1 * | 5/2005 | Ward et al. | ..................... | 345/660 |
| 7,164,427 B2 * | 1/2007 | Doyle et al. | ................... | 345/565 |
| 7,330,163 B2 * | 2/2008 | Nakai et al. | ................... | 345/1.1 |
| 7,365,908 B2 * | 4/2008 | Dolgoff | ........................ | 359/463 |
| 7,400,097 B2 * | 7/2008 | Maede et al. | .............. | 315/169.2 |
| 7,439,936 B2 * | 10/2008 | Kinugasa et al. | .............. | 345/1.1 |
| 7,804,497 B2 * | 9/2010 | Song et al. | ..................... | 345/204 |
| 8,248,425 B2 * | 8/2012 | Ghosh | ........................... | 345/536 |
| 8,743,019 B1 * | 6/2014 | Eng | ................................ | 345/1.1 |

(Continued)

FOREIGN PATENT DOCUMENTS

| | | |
|---|---|---|
| CN | 1763832 A | 4/2006 |
| CN | 101556780 A | 10/2009 |

(Continued)

OTHER PUBLICATIONS

State Intellectual Property Office of the People'S Republic of China, "Office Action", Apr. 11, 2013, China.

(Continued)

*Primary Examiner* — Dwayne Bost
*Assistant Examiner* — Darlene M Ritchie
(74) *Attorney, Agent, or Firm* — WPAT, PC; Justin King

(57) ABSTRACT

A display apparatus comprises a plurality of display panels and a time controller electrically coupled to each of the display panels respectively. The time controller is configured for sending out at least two priority control signals to each of the display panels according to an image data, to select at least one of the display panels to displaying the image data.

12 Claims, 3 Drawing Sheets

(56) References Cited

U.S. PATENT DOCUMENTS

| | | | |
|---|---|---|---|
| 8,766,993 B1* | 7/2014 | Hobbs | 345/536 |
| 2002/0003507 A1* | 1/2002 | Dodge | 345/3.1 |
| 2003/0222895 A1* | 12/2003 | Arai | 345/698 |
| 2004/0046772 A1* | 3/2004 | Ouchi et al. | 345/690 |
| 2005/0012701 A1 | 1/2005 | Low et al. | |
| 2005/0253778 A1* | 11/2005 | Ku et al. | 345/1.3 |
| 2006/0038740 A1* | 2/2006 | Jung et al. | 345/1.1 |
| 2006/0087477 A1* | 4/2006 | Kang et al. | 345/1.1 |
| 2006/0214873 A1 | 9/2006 | Park et al. | |
| 2007/0103383 A1* | 5/2007 | Sposato et al. | 345/1.1 |
| 2008/0129760 A1* | 6/2008 | Phan | 345/690 |
| 2008/0186253 A1* | 8/2008 | Kim | 345/3.3 |
| 2008/0211732 A1* | 9/2008 | Jung et al. | 345/1.1 |
| 2008/0297544 A1* | 12/2008 | Huang | 345/699 |
| 2009/0033650 A1* | 2/2009 | Takeda | 345/214 |
| 2009/0096711 A1* | 4/2009 | Jang et al. | 345/1.3 |
| 2009/0102744 A1* | 4/2009 | Ram | 345/1.1 |
| 2009/0243958 A1* | 10/2009 | Matsumoto | 345/1.1 |
| 2010/0005396 A1* | 1/2010 | Nason et al. | 715/746 |
| 2010/0156885 A1* | 6/2010 | Cho et al. | 345/214 |
| 2010/0201698 A1* | 8/2010 | Lee | 345/536 |
| 2010/0201878 A1* | 8/2010 | Barenbrug et al. | 348/563 |
| 2011/0001687 A1* | 1/2011 | Srinivasan et al. | 345/3.1 |
| 2012/0050314 A1* | 3/2012 | Wang | 345/619 |
| 2014/0184472 A1* | 7/2014 | Xia et al. | 345/1.3 |

FOREIGN PATENT DOCUMENTS

| | | |
|---|---|---|
| JP | 2002-341836 | 11/2002 |
| TW | 552575 | 9/2003 |
| TW | 1242139 | 10/2005 |
| TW | 200619751 A | 6/2006 |
| TW | 200745940 A | 12/2007 |
| TW | 201025283 A | 7/2010 |

OTHER PUBLICATIONS

Taiwan Intellectual Property Office, "Office Action", Jul. 18, 2013, Taiwan.

* cited by examiner

DISPLAY APPARATUS COMPRISING MULTIPLE DISPLAY PANELS WITH DIFFERENT RESOLUTIONS

FIELD OF THE INVENTION

The present invention relates to the display field, and more particularly to a display apparatus.

BACKGROUND OF THE INVENTION

With the rapid development of the science and technology, the flat display apparatus (such as the electrophoretic display apparatus) has many advantages, such as high image quality, little size, light weight, wide application-range and little power-consumption, etc., thus it is widely applied into various consumable electronic products, such as mobile phones, notebook computers, desktop displays and televisions, etc., and has gradually substituted the conventional cathode ray tube (CRT) display apparatus to be a main trend of the display apparatus.

Currently, some consumable electronic products have already not satisfied to display images on a single display panel, and they may comprise two or more display panels according to actual need. If an electronic product comprises a plurality of display panels, each of the display panels must have a corresponding time controller and a related driving circuit. Therefore, the circuit of the electronic product is comparatively complex, and the corresponding control method is also very complex.

SUMMARY OF THE INVENTION

Therefore, the present invention relates to a display apparatus with a plurality of display panels, of which a corresponding circuit and a corresponding control method are sample.

The present invention provides a display apparatus, which comprises a plurality of display panels and a time controller electrically coupled to each of the display panels. The time controller is configured for sending out at least two priority control signals to each of the display panels according to an image data, for selecting at least one of the display panels to display the image data.

In an exemplary embodiment of the present invention, the image data is corresponding to a display resolution of the selected display panel, so as to employ the selected display panel with the corresponding display resolution for displaying the image data, and wherein the display panels comprise a main display panel and a subordinate display panel.

In an exemplary embodiment of the present invention, the priority control signals comprise a first priority control signal and a second priority control signal. The selected display panel is the main display panel, and wherein the first priority control signal and the second priority control signal sent to the main display panel are both in logic high potential, and the first priority control signal and the second priority control signal sent to the subordinate display panel are both in logic low potential, for selecting the main display panel instead of the subordinate display panel to display the image data.

In an exemplary embodiment of the present invention, the priority control signals comprise a first priority control signal and a second priority control signal. The selected display panel is the subordinate display panel, and wherein the first priority control signal and the second priority control signal sent to the main display panel are both in logic low potential, and the first priority control signal and the second priority control signal sent to the subordinate display panel are both in logic high potential, for selecting the subordinate display panel instead of the main display panel to display the image data.

In an exemplary embodiment of the present invention, the image data is corresponding to a display resolution of a combination of the selected display panels, so as to employ the combination of the selected display panels with the corresponding display resolution for displaying the image data. The display panels comprise a main display panel and at least one subordinate display panel.

In an exemplary embodiment of the present invention, the priority control signals comprise a first priority control signal and a second priority control signal. The selected display panels are the combination of the main display panel and the subordinate display panel, and wherein the first priority control signal and the second priority control signal sent to the main display panel are both in logic high potential, the first priority control signal sent to the subordinate display panel is in logic low potential and the second priority control signal sent to the subordinate display panel is in logic high potential, for selecting the combination of the main display panel and the subordinate display panel to display the image data.

In an exemplary embodiment of the present invention, the image data is corresponding to a display resolution of a combination of the selected display panels, so as to employ the selected display panels with the corresponding display resolution for displaying the image data. The display panels comprise a main display panel and a plurality of subordinate display panels.

In an exemplary embodiment of the present invention, The image data is corresponding to a display resolution of a combination of the selected display panels, and the combination of the display panels is configured for displaying the image data according to a combination of the priority control signals sent to the selected display panels.

In an exemplary embodiment of the present invention, the display apparatus further comprises an image-data decoder. The time controller is electrically coupled to the image-data decoder to sample the image data.

In an exemplary embodiment of the present invention, the display panels are electrophoretic display panels respectively.

In summary, the display apparatus of the present invention may employ the time controller to select the corresponding display panel with the corresponding display resolution or the combination of the display panels with the corresponding display resolution to display the image data, thus the circuit thereof is sample, and the control method thereof is also sample.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
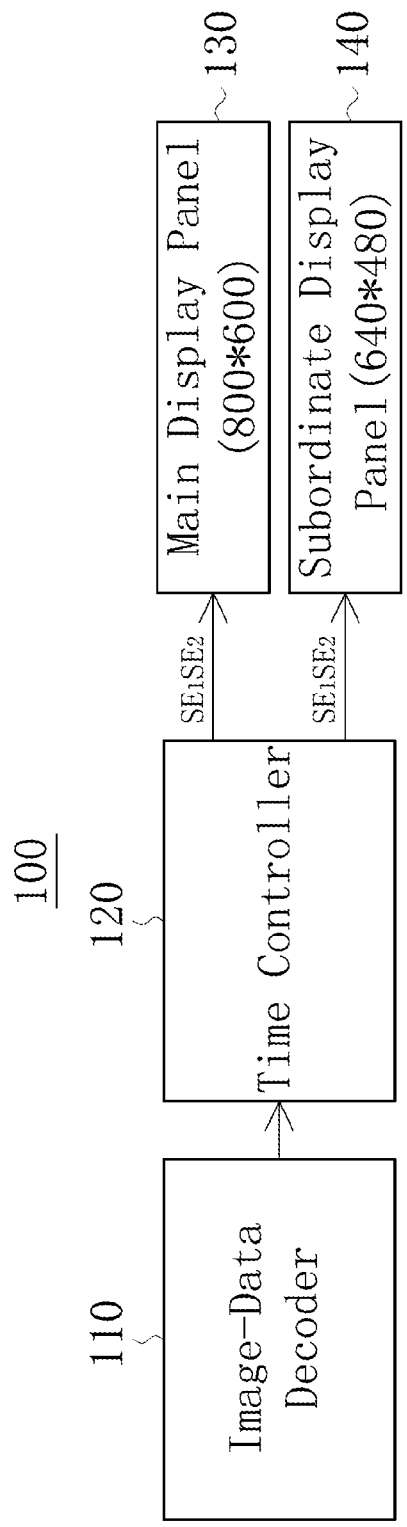
FIG. 1 is a schematic view of a display apparatus in accordance with a first exemplary embodiment of the present invention.

FIG. 1 is a schematic view of a display apparatus in accordance with a first exemplary embodiment of the present invention. As shown in FIG. 1, the display apparatus 100 may comprise an image-data decoder 110, a time controller 120, a main display panel 130 and a subordinate display panel 140. The time controller 120 is electrically coupled to the image-data decoder 110, for reading out image data decoded by the image-data decoder 110. Furthermore, the time controller 120 is also electrically coupled to the main display panel 130 and the subordinate display panel 140, for sending out at least two priority control signals (such as two priority control signals SE1 and SE2) to each of the main display panel 130 and the subordinate display panel 140 according to the image data, to select one of the display panels with the corresponding display resolution to display the image data. The main display panel 130 and the subordinate display panel 140 may be flat display panels, such as electrophoretic display panels.

Preferably, in the exemplary embodiment, the display resolution of the main display panel 130 is different from that of the subordinate display panel 140. For example, the display resolution of the main display panel 130 may be 800*600, and the display resolution of the subordinate display panel 140 may be 640*480.

If the image data is corresponding to a display resolution of 800*600, that is, the image data is suited to be displayed by a display panel with the display resolution of 800*600, the two priority control signals SE1 and SE2 sent from the time controller 120 to the main display panel 130 are both in the logic high potential, and the two priority control signals SE1 and SE2 sent to the subordinate display panel 140 are both in the logic low potential. Thus the main display panel 130 is selected instead of the subordinate display panel 140, and the main display panel 130 with the display resolution of 800*600 is used to display the image data.

If the image data is corresponding to a display resolution of 640*480, that is the image data is suited to be displayed by a display panel with the display resolution of 640*480, the two priority control signals SE1 and SE2 sent from the time controller 120 to the main display panel 130 are both in the logic low potential, and the two priority control signals SE1 and SE2 sent to the subordinate display panel 140 are both in the logic high potential. Thus the subordinate display panel 140 is selected instead of the main display panel 130, and the subordinate display panel 140 with the display resolution of 640*480 is used to display the image data.

Figure 2:
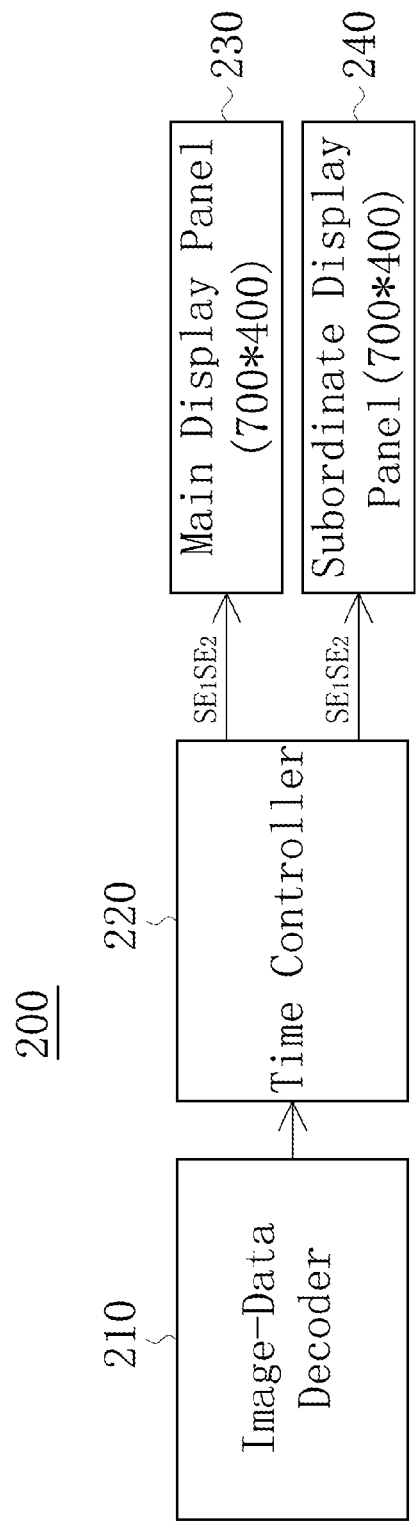
FIG. 2 is a schematic view of a display apparatus in accordance with a second exemplary embodiment of the present invention.

FIG. 2 is a schematic view of a display apparatus in accordance with a second exemplary embodiment of the present invention. As shown in FIG. 2, the display apparatus 200 is similar with the display apparatus 100 as shown in FIG. 1, except that the display resolution of the main display panel 230 is same to that of the subordinate display panel 240. For example, the display resolution of the main display panel 230 is 700*400, and the display resolution of the subordinate display panel 240 is also 700*400.

Therefore, for the present exemplary embodiment, if the image data read out by the time controller 220 from the image-data decoder 210 is corresponding to a display resolution of 700*400, that is, the image data is suited to be display by a display panel with the display resolution of 700*400, the main display panel 230 or the subordinate display panel 240 are both possibly selected. At this moment, according to the actual need, the two priority control signals SE1 and SE2 sent from the time controller 220 to the main display panel 230 may be both in the logic high potential, and the two priority control signals SE1 and SE2 sent to the subordinate display panel 240 may be both in the logic low potential, for selecting the main display panel 230 instead of the subordinate display panel 240 to display the image data. Of course, the two priority control signals SE1 and SE2 sent from the time controller 220 to the main display panel 230 may be in the logic low potential, and the two priority control signals SE1 and SE2 sent to the subordinate display panel 240 may be in the logic high potential, for selecting the subordinate display panel 240 instead of the main display panel 230 to display the image data.

In addition, since the display resolution of the main display panel 230 is same to that of the subordinate display panel 240, the main display panel 230 and the subordinate display panel 240 may cooperate together to display an image with a higher display resolution (such as 700*800). Therefore, if the image data read out by the time controller 220 from the image-data decoder 210 is corresponding to a display resolution of 700*800, that is, the image data is suited to be displayed by a display panel with the display resolution of 700*800, the two priority control signals SE1 and SE2 sent from the time controller 220 to the main display panel 230 are both in the logic high potential, and the priority control signal SE1 sent to the subordinate display panel 240 is in the logic low potential and the priority control signals SE2 sent to the subordinate display panel 240 is in the logic high potential, thus the main display panel 230 and the subordinate display panel 240 are simultaneously selected to cooperate together for displaying the image data. That is, the combination of the main display panel 230 and the subordinate display panel 240 is selected such that the combination of the selected display panels has the display resolution of 700*800 for displaying the image data. Furthermore, the priority control signals SE1 and SE2 sent to the main display panel 230 and the subordinate display panel 240 respectively may be further used to determine a sequence for displaying the image data by the main display panel 230 and the subordinate display panel 240 according to the combinations of the priority control signals SE1 and SE2 sent to the main display panel 230 and the subordinate display panel 240 respectively, except selecting one of the display panels.

Figure 3:
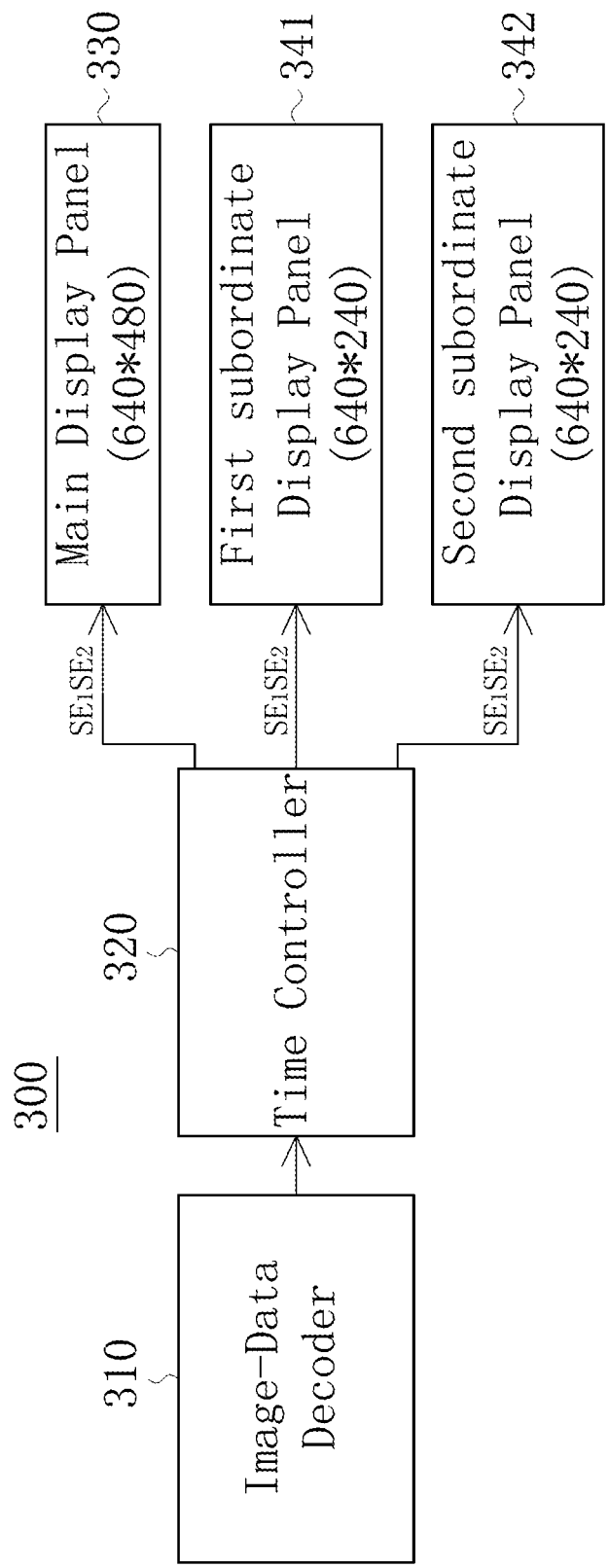
FIG. 3 is a schematic view of a display apparatus in accordance with a third exemplary embodiment of the present invention.

FIG. 3 is a schematic view of a display apparatus in accordance with a third exemplary embodiment of the present invention. As shown in FIG. 3, the display apparatus 300 is similar with the display apparatus as shown in FIG. 2, except that the display apparatus 300 of the present exemplary embodiment does not comprise only one subordinate display panel, and comprises a first subordinate display panel 341 and a second subordinate display panel 342. In addition, the display resolution of the first subordinate display panel 341 is same to that of the second subordinate display panel 342, and the display resolutions of the first subordinate display panel 341 and the second display panel 342 are in relation to the display resolution of the main display panel 330. For example, the display resolution of the main display panel 330 is 640*480, the display resolution of the first subordinate display panel 341 is 640*240, and the display resolution of the second subordinate display panel 342 is 640*240.

Therefore, in the present exemplary embodiment, if the image data read out by the time controller 320 from the image-data decoder 310 is corresponding to a display resolution of 640*480, that is, the image data is suited to be displayed by a display panel with the display resolution of 640*480, the time controller 320 may select the main display panel 330 to display the image data, or select the combination of the first subordinate display panel 341 and the second subordinate display panel 342 to display the image data.

If the image data read out by the time controller 320 from the image-data decoder 310 is corresponding to a display resolution of 640*240, that is, the image data is suited to be displayed by a display panel with the display resolution of 640*240, the time controller 320 may select the first subordinate display panel 341 or the second subordinate display panel 342 to display the image data.

If the image data read out by the time controller 310 from the image-data decoder 310 is corresponding to a display resolution 640*720, that is, the image data is suited to be displayed by a display panel with the display resolution of 640*720, the time controller 320 may select a combination of the main display panel 330 and the first subordinate display panel 341, or a combination of the main display panel 330 and the second subordinate display panel 342, to display the image data.

If the image data read out by the time controller 320 from the image-data decoder 310 is corresponding to a display resolution of 640*960, that is the image data is suited to be displayed by a display panel with the display resolution of 640*960, the time controller 320 may select a combination of the main display panel 330, the first subordinate display panel 341 and the second display panel 342 to display the image data.

Figure 4:
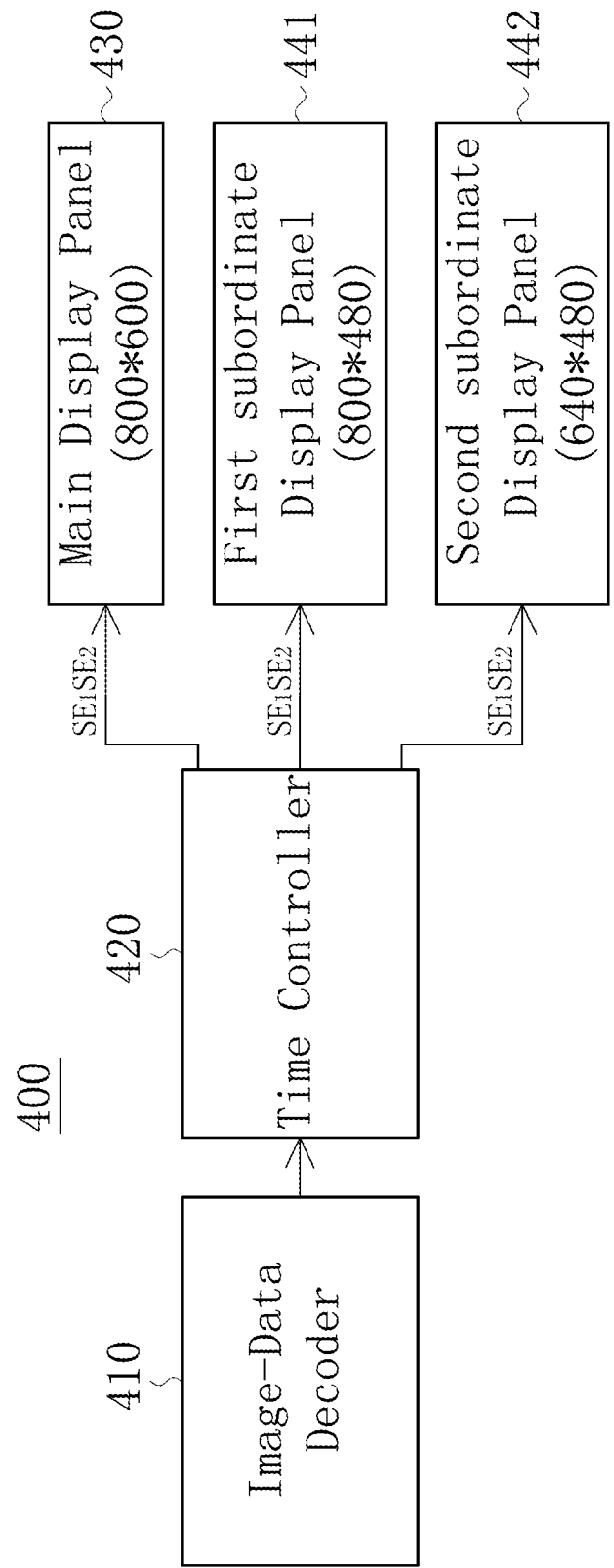
FIG. 4 is a schematic view of a display apparatus in accordance with a fourth exemplary embodiment of the present invention.

FIG. 4 is a schematic view of a display apparatus in accordance with a fourth exemplary embodiment of the present invention. As shown in FIG. 4, the display apparatus 400 is similar with the display apparatus 300 as shown in FIG. 3, except that the display resolution of the first subordinate display panel 441 is different from that of the second subordinate display panel 442, and only the display resolution of the first subordinate display panel 441 is in relation to that of the main display panel 430. For example, the display resolution of the main display panel 430 is 800*600, the display resolution of the first subordinate display panel 441 is 800*480, and the display resolution of the second subordinate display panel 442 is 640*480.

Therefore, if the image data read out by the time controller 420 from the image-data decoder 410 is corresponding to a display resolution of 800*600, that is the image data is suited to be displayed by a display panel with the display resolution of 800*600, the time controller 430 may select the main display panel 430 to display the image data.

If the image data read out by the time controller 420 from the image-data decoder 410 is corresponding to a display resolution of 800*480, that is the image data is suited to be displayed by a display panel with the display resolution of 800*480, the time controller 430 may select the first subordinate display panel 441 to display the image data.

If the image data read out by the time controller 420 from the image-data decoder 410 is corresponding to a display resolution of 640*480, that is the image data is suited to be displayed by a display panel with the display resolution of 640*480, the time controller 430 may select the second subordinate display panel 442 to display the image data.

If the image data read out by the time controller 420 from the image-data decoder 410 is corresponding to a display resolution of 800*1080, that is the image data is suited to be displayed by a display panel with the display resolution of 800*1080, the time controller 430 may select a combination of the main display panel 430 and the first subordinate display panel 441 to display the image data.

In summary, the display apparatus of the present invention may employ the time controller to select the corresponding display panel with the corresponding display resolution or the combination of the display panels with the corresponding display resolution to display the image data, thus the circuit thereof is sample, and the control method thereof is also sample.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising:
    a plurality of display panels set in the display apparatus; and
    a time controller electrically coupled to each of the display panels;
    wherein each of the display panels has a fixed display resolution;
    wherein the time controller is configured for sending out at least two priority control signals to each of the display panels according to an image data with a fixed image resolution, for selecting one of said display panels according to said fixed image resolution and said display resolutions; and
    wherein the display panels comprise a main display panel and a subordinate display panel.

2. The display apparatus according to claim 1, wherein the priority control signals comprise a first priority control signal and a second priority control signal, and the selected display panel is the main display panel, and wherein the first priority control signal and the second priority control signal sent to the main display panel are both in logic high potential, and the first priority control signal and the second priority control signal sent to the subordinate display panel are both in logic low potential, for selecting the main display panel instead of the subordinate display panel to display the image data.

3. The display apparatus according to claim 1, wherein the priority control signals comprise a first priority control signal and a second priority control signal, and the selected display panel is the subordinate display, and wherein the first priority control signal and the second priority control signal sent to the main display panel are both in logic low potential, and the first priority control signal and the second priority control signal sent to the subordinate display panel are both in logic high potential, for selecting the subordinate display panel instead of the main display panel to display the image data.

4. The display apparatus according to claim 1, wherein the display panels have same fixed resolutions, and the display panels cooperate together to share the display of image data.

5. A display apparatus, comprising:
    a plurality of display panels set in the display apparatus; and
    a time controller electrically coupled to each of the display panels;

wherein each of the display panels has a fixed display resolution;

wherein the time controller is configured for sending out at least two priority control signals to each of the display panels according to an image data with a fixed image resolution, for selecting a combination of one or more of said display panels according to said fixed image resolution and said display resolutions, said combination of the selected display panels has a sum of said fixed display resolutions equal to said fixed image resolution, wherein the display panels comprise a main display panel and a subordinate display panel; and wherein the resolution of the main display panel is different from that of the subordinate display panel.

6. The display apparatus according to claim 5, wherein the priority control signals comprise a first priority control signal and a second priority control signal, and the selected display panels are the combination of the main display panel and the subordinate display panel, and wherein the first priority control signal and the second priority control signal sent to the main display panel are both in logic high potential, the first priority control signal sent to the subordinate display panel is in logic low potential and the second priority control signal sent to the subordinate display panel is in logic high potential, for selecting the combination of the main display panel and the subordinate display panel to display the image data.

7. The display apparatus according to claim 5, wherein the display panels have same fixed resolutions, and the display panels cooperate together to share the display of image data.

8. A display apparatus, comprising:
a plurality of display panels set in the display apparatus; and
a time controller electrically coupled to each of the display panels;

wherein each of the display panels has a fixed display resolution;

wherein the time controller is configured for sending out at least two priority control signals to each of the display panels according to an image data with a fixed image resolution, for selecting a combination of one or more but not all of said display panels according to said fixed image resolution and said display resolutions, said combination of the selected display panels has a sum of said fixed display resolutions equal to said fixed image resolution; and wherein the display panels comprise a main display panel and a plurality of subordinate display panels.

9. The display apparatus according to claim 8, wherein the image data is corresponding to a display resolution of a combination of the selected display panels, and the combination of the display panels is configured for displaying the image data according to a combination of the priority control signals sent to the selected display panels.

10. The display apparatus according to claim 8, further comprising an image-data decoder, wherein the time controller is electrically coupled to the image-data decoder to sample the image data.

11. The display apparatus according to claim 8, wherein the display panels are electrophoretic display panels respectively.

12. The display apparatus according to claim 8, wherein the display panels have same fixed resolutions, and the display panels cooperate together to share the display of image data.

* * * * *